United States Patent [19]

Lecher

[11] Patent Number: 5,125,714
[45] Date of Patent: Jun. 30, 1992

[54] FRONT REGION OF PASSENGER MOTOR VEHICLES

[75] Inventor: Franz Lecher, Böblingen, Fed. Rep. of Germany

[73] Assignee: Daimler-Benz AG, Fed. Rep. of Germany

[21] Appl. No.: 774,378

[22] Filed: Oct. 10, 1991

Related U.S. Application Data

[63] Continuation of Ser. No. 572,542, Aug. 27, 1990, abandoned.

[30] Foreign Application Priority Data

Aug. 26, 1989 [DE] Fed. Rep. of Germany ....... 3928327

[51] Int. Cl.⁵ ............................................. B62D 35/00
[52] U.S. Cl. ................................. 296/180.5; 296/208; 296/194; 362/64; 180/68.1; 160/DIG. 1; 160/201
[58] Field of Search ............... 296/194, 208, 180.5; 362/64, 290, 319, 325; 180/68.1-68.3, 68.6; 160/DIG. 1, 201

[56] References Cited

U.S. PATENT DOCUMENTS

| | | | |
|---|---|---|---|
| 1,161,444 | 11/1915 | Boughton | 160/DIG. 1 |
| 1,298,094 | 3/1919 | Rishel | 160/DIG. 1 |
| 2,888,274 | 5/1959 | Premo | 296/208 X |
| 3,445,644 | 5/1969 | Michelotti | 362/64 |
| 3,504,168 | 3/1970 | Johnson | 362/64 |
| 3,544,786 | 12/1970 | Baker | 362/64 X |
| 4,310,872 | 1/1982 | Lauve | 362/64 X |
| 4,737,893 | 4/1988 | Horansky et al. | 362/64 |
| 4,947,295 | 8/1990 | Carrell | 362/80 X |

FOREIGN PATENT DOCUMENTS

| | | |
|---|---|---|
| 1630755 | 6/1971 | Fed. Rep. of Germany . |
| 2813035 | 10/1978 | Fed. Rep. of Germany . |
| 3442042 | 11/1986 | Fed. Rep. of Germany . |
| 1034340 | 7/1953 | France ............... 180/68.2 |

Primary Examiner—Dennis H. Pedder
Attorney, Agent, or Firm—Evenson, Wands, Edwards, Lenahan & McKeown

[57] ABSTRACT

A front region of a motor vehicle has two front headlight groups and air inlet openings for the engine compartment, as well as a movable cover for both the front headlight groups and the air inlet openings. The air inlet openings are arranged above and/or below each front headlight group. At least one movable cover is provided for each arrangement consisting of a front headlight group and air inlet openings.

20 Claims, 2 Drawing Sheets

FRONT REGION OF PASSENGER MOTOR VEHICLES

This is a continuation of application Ser. No. 07/572,542, filed Aug. 27, 1990, now abandoned.

BACKGROUND AND SUMMARY OF THE INVENTION

The present invention relates to a front region of a motor vehicle, and, in particular, to a passenger motor vehicle front region having two front headlight groups and air inlet openings for the engine compartment, as well as having at least one movable cover for the front headlight groups and the air inlet openings.

German Offenlegungsschrift 1,630,755 discloses a one-piece cover for radiators and headlights. This cover extends over a large region of the front of the passenger motor vehicle and covers at the same time the front headlights and the radiator. It can be pushed by means of parallelogram guides into a position releasing them. In the covered position of the device, a uniform appearance of the front view of the passenger motor vehicle is achieved; in addition, good aerodynamics of the front region are also achieved. In the uncovered position, however, the front region gives a non-uniform impression, and an aerodynamically favorable shape is no longer achieved.

It is also known, as shown in DE-PS 34 42 042, to provide countersunk headlights in the front region of a passenger motor vehicle with, in each case, one cover which can be moved in front of each front headlight. Each cover can be pivoted around a horizontal axis in front of the opening, formed in the front region, in front of the respective headlight group. The cover, in its closed position, completely fills the opening in front of the headlight, as a result of which the front region of the passenger motor vehicle has a streamlined shape with the coverings closed.

Furthermore, it is known from German Offenlegunsschrift 28 13 035 to provide each of the two headlights of a passenger motor vehicle with two flaps which can be folded in front of the headlight. The two flaps are arranged in each case to be pivotable around a horizontal axis. One flap is held in the opened state above the opening created by the countersinking of the headlight in the front region, and the other flap is held below the opening with the aid of a common activation device. This activation device folds the two flaps for the closed position of the headlight in front of said headlight. A gap is produced between the two flaps in the closed position by recesses on the edge associated in each case with the other flap. A small quantity of light can still emerges through the gap from the headlight even in the closed position.

It is an object of the present invention to provide a front region of a passenger motor vehicle which ensures an aesthetically uniform and aerodynamically favorable appearance of the front region of the passenger motor vehicle in every position of the cover.

This object has been achieved in accordance with the present invention in that the air inlet openings are arranged at least partially above and/or below each front headlight group, and at least one movable cover is provided for each arrangement consisting of a front headlight group and air inlet openings arranged above and/or below that group. In addition to the aesthetically uniform appearance, the aerodynamics of the front region constructed in accordance with the present invention are not influenced substantially in any position of the cover. It is now possible to cover the front headlight group in a simple manner either completely or partially and thus both to protect it against dirtying or damage but, when partially or fully opened, to maintain the effect of a headlight flasher or of a position light, and finally to fulfil the complete light functions. The arrangement according to the present invention of the air inlet openings permits fresh air to be additionally introduced into the engine compartment when required, i.e., to control the maximum air feed. In turbo-diesel vehicles, cold air can also be taken in. In the completely opened position of the cover, the functions of the front headlight group are not impaired.

In another embodiment of the invention, for each arrangement consisting of front headlight groups and air inlet openings, two covers are provided, of which one cover is provided for the front headlight group and the other cover for the air inlet openings, and which can be controlled independently of one another. One cover can serve for covering the front headlight group, the other for independently covering the air inlet openings. As a result, it is possible, for example, to control the covering of the air inlet openings as function of the engine compartment temperature, and to control the headlight cover as a function of the respective light conditions and external conditions.

In one embodiment of the present invention, the cover of each front headlight group can advantageously be moved from the top to the bottom. The front headlight group is referred to hereinafter as a "headlight".

In another embodiment, the cover for the air inlet openings can be moved form the top to the bottom.

In a further of the present invention, the cover can consist of a number of lamellas which are arranged next to one another in rows in the direction of their path of movement. As a result, the cover can be redirected in order to be moved, for example, from a position under the engine hood to in front of the headlight and/or the air inlet opening.

In order to permit the various functions of the cover, the cover can be locked or stopped in a plurality of positions. In one position, it can be locked, for example, below the engine hood, in a further position partially in front of the headlight, and in a still further position in a setting completely covering the headlight. Furthermore, in one position, both the headlight and the air inlet openings can be covered. For example, it is also possible to arrange the cover relative to the headlight so as to cover only the air inlet openings.

A particularly simple embodiment of the present invention is such that, on the end sides of the lamellas, pins are guided in corresponding guide rails attached to the vehicle. This ensures a functionally reliable and simple guiding.

In a further embodiment of the invention, the lamellas are vacuum-coated in a non-translucent manner on one side. For this purpose, according to one embodiment they consist of a transparent plastic. As a result, the headlight can be covered, so that from the outside it is not visible, but light from the headlight can, however, penetrate to the outside from the inside.

BRIEF DESCRIPTION OF THE DRAWINGS

These and other objects, features and advantages of the present invention will become more apparent from the following detailed description of a presently preferred embodiment when taken in conjunction with the accompanying drawings wherein.

DETAILED DESCRIPTION OF THE DRAWING

Figure 1:
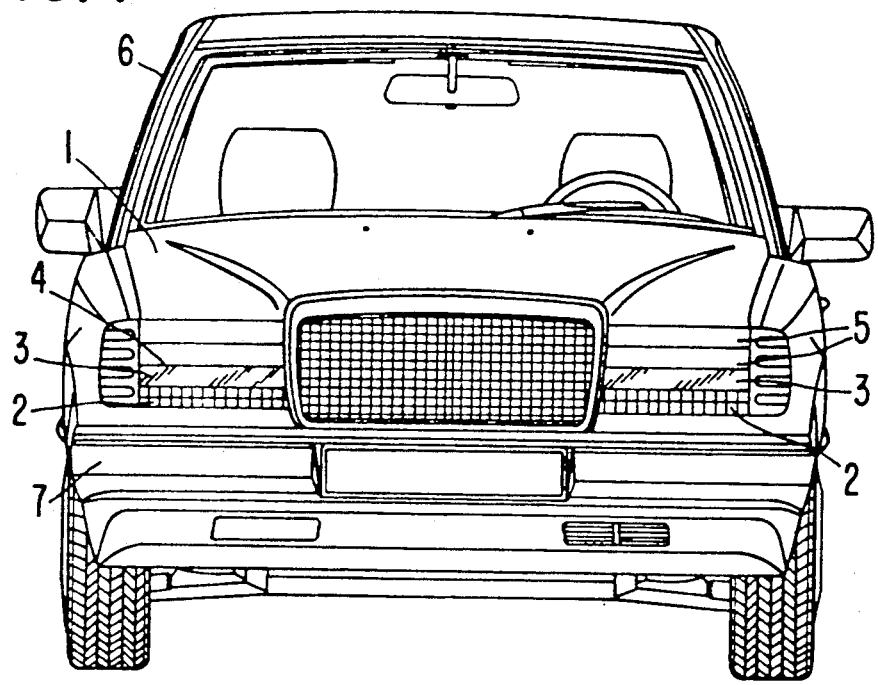
FIG. 1 is a front view of a passenger motor vehicle having headlights covered in accordance with the present invention.

FIG. 1 shows a passenger vehicle 6 having a cover 4 according to one embodiment of the present invention for a combined covering of the headlights 3 and of the air inlet openings 2 of a passenger motor vehicle 6. For each of the right and the left half of the front region of the passenger motor vehicle 6, a cover 4 is provided for the headlights 3 and the air inlet openings 2. The left and right covers 4 can, for matters of expediency, be activated by common actuating elements (not shown) in order to permit synchronization of the movement of the covers 4. An individual control of the covers 4 is, however, also possible in order to ensure, for example, the function of a parking light of the passenger motor vehicle 6 in the shut-off state. The actuating elements can be activated electrically, pneumatically or mechanically.

The cover 4 is constructed similar to and therefore is referred to below as a Venetian shutter having horizontally disposed lamellas 5 arranged next to one another in rows in their path of movement. The Venetian shutter cover 4 runs closely in front of the lens of the headlight 3 in the vertical direction and is, for example, turned under the engine hood or bonnet 1 or under the bumper 7. The Venetian shutter matches exactly the external contour of the front region of the passenger motor vehicle. Since the Venetian shutter 4 runs pasts very closely parallel to the lens, virtually no change in the aerodynamic values of the front region occurs between the open, partially closed and completely closed position of the Venetian shutter 4. The lamellas 5 have, for example, on their end faces, pins 7 (FIG. 6) which run in guide rails 6. These guide rails are mounted essentially in the vertical direction on both sides of the headlights 3 and of the air inlet openings 2 and in their further extension towards the motor vehicle inner compartment under the engine bonnet 1. For as long a time period as it is not required, the Venetian shutter 4 can be mounted under the engine bonnet 1, for example in the aforementioned guide rails or in rolled-up form.

It is also conceivable for the covers 4 to be arranged in, for example, the region of the bumper 7 and when required, to be moved out in an upward direction to cover the headlights 3. The air inlet openings 2 would be arranged above the headlights 3 in that embodiment.

Figure 2:
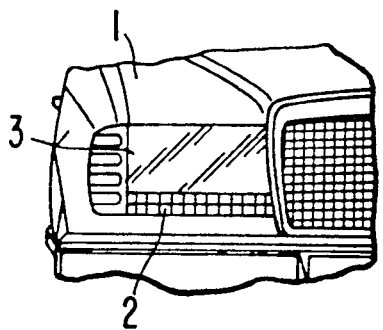
FIG. 2 is a fragmenting front view of the headlight similar to FIG. 1 with the cover in a fully opened position.

FIG. 2 shows a setting of the Venetian shutter 4 in which it has been moved totally under the engine bonnet or hood 1 so as to be invisible. The headlight 3 is completely exposed and can carry out all the light functions. The air inlet opening 2 is also fully exposed, as a result of which additional fresh air can flow into the engine compartment. The setting shown here of the Venetian shutter 4 is advantageous for driving at night, where dipped headlights or full beam are required and there must be no limitation on the lens of the headlight 3 for the purpose of developing the full light intensity. The additional cooling by the opened air inlet openings 2 allows use of the passenger motor vehicle without problems in very warm countries where high temperatures prevail even at night.

Figure 3:
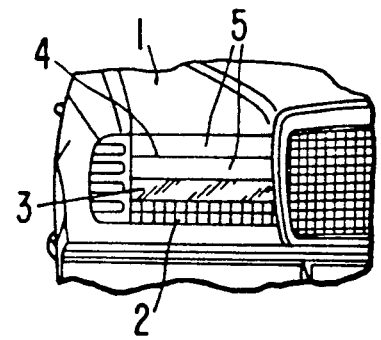
FIG. 3 is a fragmentary view of the headlight similar to FIG. 1 with the cover partially protecting the headlight.

FIG. 3 shows a setting of the Venetian shutter 4 in which it is partially moved out from under the engine bonnet 1, and two lamellas 5 of the cover 4 covering approximately two thirds of the headlight 3. The air inlet openings 2 are still open. This setting of the Venetian shutter 4 has proved suitable for operation during the day, since a large region of the headlight 3 is covered and the activation, for example, of the headlight flasher or the function of the parking light is still possible. In the warm summer months, opening the air inlet openings 2 brings about additional cooling of the engine compartment.

Figure 6:
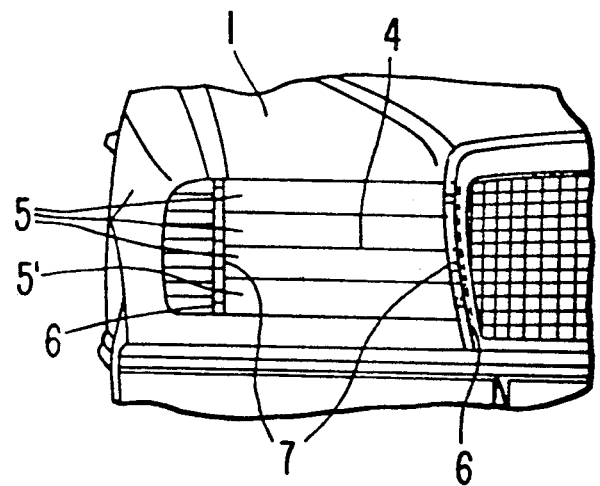
FIG. 6 is a view of another embodiment similar to FIG. 5 but on an enlarged scale showing two covers and guide rails and pins for the lamellas constituting the covers.

In one embodiment of the invention FIG. 6, a Venetian shutter having lower lamella 5' for covering the air inlet openings can be mounted and controlled independently of the headlight Venetian shutter having upper lamellas 5 and, for example, can be moved out from the bumper side over the air inlet openings when required. A control as a function of, for example, the engine compartment temperature can be used to control the air inlet Venetian shutter.

Figure 4:
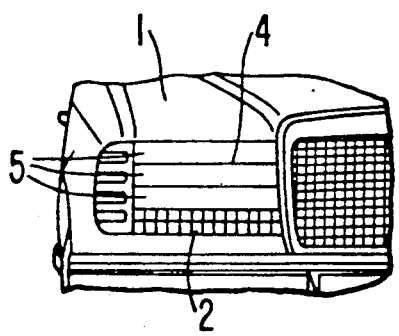
FIG. 4 is a fragmentary front view of the headlight similar to FIG. 1 in which is the headlight is completely protected by the cover.

FIG. 4 shows the Venetian shutter 4 in a position in which it completely covers the headlight 3. In this setting, for example, three lamellas 5 under the engine hood 1 are placed in front of the headlight 3. The air inlet opening 2 which is constructed, for example, as a kind of grid is still open. The lamellas 5 are each approximately the size of the air inlet openings 2. The area ratio between the headlight 3 and the air inlet opening 2 is thereby approximately 3:-1 Thus, three lamellas 5 are required in order to cover the headlight 3 completely, and one other lamellas 5 is required in order to cover the air inlet opening 2.

Figure 7:
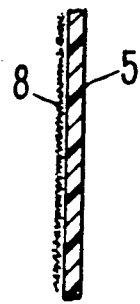
FIG. 7 is a cross-sectional view of an isolated lamella used for the covers shown in FIGS. 1 and 6 and schematically showing that one side has been vacuum coated to prevent translucency.

The lamellas 5 can be manufactured from sheet metal. It is also advantageous to manufacture the lamellas 5 from a plastic material. For example, a transparent plastic can be selected which can be treated on one side with a non-transparent vacuum-coating 8 as shown in FIG. 7. This vacuum-coating can be, for example, of the same color as the passenger motor vehicle 6 or even of a contrasting color. Vacuum coating on one side has the advantage that a uniform appearance arises in the closed setting of the headlight 3, but also light from the headlight 3 can penetrate from the inside to the outside. It is thus possible to activate a headlight flasher or a parking light.

Figure 5:
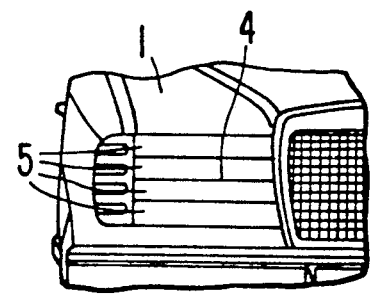
FIG. 5 is a fragmentary front view of the headlight similar to FIG. 1 with the headlight and air inlet openings being covered.

In FIG. 5, the Venetian shutter 4 is placed in a position in which both the headlight 3 and the air inlet openings 2 are completely covered. In this setting, four lamellas 5 are visible. Such a setting of the Venetian shutter 4 is advantageous for operation of the passenger motor vehicle 6 during the day in the cold winter months, in which an additional supply of fresh air for the engine compartment is not necessary.

It is also possible to provide either a larger number of lamellas 5 or instead of the lamellas 5, a one-piece cover, for example a plastic web, can also be provided which can be rolled up under the engine hood 1 or under the bumper 7 or can be stored in a similar manner.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A motor vehicle having two front headlight groups in a front region of an engine compartment, air inlet openings arranged in a vertical direction with respect to and at least partially adjacent each front headlight group, and a plurality of relatively movable covers having substantially vertically extending guide rails operatively arranged in front of each of the front headlight groups and the associated air inlet openings, said covers being movable so as selectively to completely cover the front headlight groups and air inlet openings, to expose only the air inlet openings, and to expose at least portions of the front headlight groups and the associated air inlet openings.

2. The motor vehicle according to claim 1, wherein the plurality of movable covers consists of two covers provided for each arrangement consisting of a front headlight group and air inlet openings, of which one of the two covers is for the front headlight group and the other cover is for the air inlet openings.

3. The motor vehicle according to claim 1, wherein the plurality of movable covers consists of lamellas which are operatively arranged next to one another in a row in a direction of a path of movement of the covers.

4. The motor vehicle according to claim 3, wherein the plurality of movable covers consists of two covers provided for each arrangement consisting of a front headlight group and air inlet openings, of which one of the two covers is for the front headlight group and the other cover is for the air inlet openings.

5. The motor vehicle according to claim 3, wherein the lamellas have a width substantially the same as a width of the front headlight group.

6. The motor vehicle according to claim 1, wherein a width of the air inlet openings is approximately equal to a width of the front headlight group 7. The motor vehicle according to claim 6, wherein the plurality of movable covers consists of lamellas which are operatively arranged next to one another in a row.

8. The motor vehicle according to claim 7, wherein lamellas have a width approximately equal to a width of the associated front headlight group.

9. The motor vehicle according to claim 1, wherein the plurality of movable covers consists of two covers provided for each arrangement consisting of a front headlight group an air inlet openings, of which one of the two covers is for the front headlight group and the other cover is for the air inlet openings.

10. The motor vehicle according to claim 9, wherein the plurality of movable covers consists of lamellas which are operatively connected next to one another in a row in a direction of a path of movement of the covers.

11. The motor vehicle according to claim 10, wherein the lamellas have a width approximately equal to a width of the associated front headlight group.

12. The motor vehicle according to claim 11, wherein a width of the air inlet openings is approximately equal to a width of the front headlight group.

13. The motor vehicle according to claim 3, wherein pins are provided at ends of the lamellas and are guided in said guide rails at the front region.

14. The motor vehicle according to claim 13, wherein the plurality of movable covers consists of two covers provided for each arrangement consisting of a front headlight group and air inlet openings, of which one of the two covers is for the front headlight group and the other cover is for the air inlet openings.

15. The motor vehicle according to claim 14, wherein the lamellas have a width approximately equal to a width of the associated front headlight group.

16. The motor vehicle according to claim 15, wherein a width of the air inlet openings is approximately equal to a width of the front headlight group.

17. The motor vehicle according to claim 13, wherein the guide rails are located laterally of the respective front headlight group and the air inlet openings.

18. The motor vehicle according to claim 1, wherein the covers are a transparent plastic.

19. The motor vehicle according to claim 18, wherein one side of the covers is vacuum-coated to prevent translucency.

20. A cover for an arrangement of a front headlight group and air inlet openings in a front region compartment in which the air inlet openings are arranged in a vertical direction with respect to and at least partially adjacent the front headlight group comprising:

lamellas operatively arranged adjacent one another in a row in a substantially vertical direction of movement of the cover and having a width approximately equal to a width of the associated front headlight group and the air inlet openings, pins provided at ends of the lamellas so as to be guided in guide rails on the vehicle body which guide rails extend substantially vertically to provide said vertical movement and and are positioned laterally to the associated front headlight group and the air inlet openings such that the cover can be moved selectively to completely cover the front headlight group and air inlet group to expose only the air inlet openings, and to expose at least portions of the front headlight group and the associated air inlet openings, and a transparent plastic which has one side vacuum-coated to prevent translucency.

* * * * *